(12) United States Patent
Huang

(10) Patent No.: US 10,531,732 B1
(45) Date of Patent: Jan. 14, 2020

(54) TABLE WITH COLLAPSIBLE LEGS

(71) Applicant: Chia-Yen Huang, Taichung (TW)

(72) Inventor: Chia-Yen Huang, Taichung (TW)

( * ) Notice: Subject to any disclaimer, the term of this patent is extended or adjusted under 35 U.S.C. 154(b) by 0 days.

(21) Appl. No.: 16/387,573

(22) Filed: Apr. 18, 2019

(30) Foreign Application Priority Data

Oct. 26, 2018 (TW) .............................. 107214620 U

(51) Int. Cl.
*A47B 9/04* (2006.01)
*A47B 9/20* (2006.01)

(52) U.S. Cl.
CPC .................. *A47B 9/04* (2013.01); *A47B 9/20* (2013.01); *A47B 2009/046* (2013.01)

(58) Field of Classification Search
CPC ........ A47B 9/04; A47B 9/20; A47B 2009/046
See application file for complete search history.

(56) References Cited

U.S. PATENT DOCUMENTS

| | | | |
|---|---|---|---|
| 2014/0020488 A1* | 1/2014 | Koch | F16H 25/12 74/89.35 |
| 2018/0140087 A1* | 5/2018 | Wu | A47B 9/20 |
| 2018/0172062 A1* | 6/2018 | Hu | A47B 9/04 |
| 2018/0184799 A1* | 7/2018 | Lin | A47B 17/02 |

FOREIGN PATENT DOCUMENTS

| | | | | |
|---|---|---|---|---|
| WO | WO-02063996 A1 * | 8/2002 | | A47B 9/20 |
| WO | WO-2011063812 A2 * | 6/2011 | | A47B 9/20 |

* cited by examiner

*Primary Examiner* — Daniel J Rohrhoff

(57) ABSTRACT

A table includes a table top with at least one collapsible leg which includes a top tube, a middle tube and a bottom tube. A connector is connected to the underside of the table top and the top end of the outer tube. An inner threaded rod is connected to a motor which is connected to the connector. An outer threaded rod is movably mounted to outside of the inner threaded rod. A top nut is fixed to the middle tube and threadedly connected to the inner threaded rod. A bottom nut is connected to the bottom tube and threadedly connected to the outer threaded rod. When the motor drives the inner threaded rod, the outer threaded rod is moved relative to the inner threaded rod so that the middle tube moves relative to the top tube, and the bottom tube moves relative to the middle tube.

14 Claims, 9 Drawing Sheets

TABLE WITH COLLAPSIBLE LEGS

BACKGROUND OF THE INVENTION

1. Fields of the Invention

The present invention relates to a table with collapsible legs, and more particularly, the collapsible legs can be extended longer and light in weight.

2. Descriptions of Related Art

The conventional table with collapsible legs comprises a table top, at least one collapsible leg and an electric driving unit. The at least one collapsible leg includes an inner tube and an outer tube in which the inner tube is retractably inserted. The electric driving unit includes a motor and at least one threaded rod which is located in the outer and inner tubes. When the motor in action, the at least one threaded rod is rotated to drive the inner tube relative to the outer tube, and the table top is moved. However, the driving unit is modularized as a one piece which cannot be amended or adjusted by the users. The modularized electric driving unit is heavy and the travels distance of the inner tube is limited.

The present invention intends to provide a table with collapsible legs, and the collapsible legs eliminate the shortcomings mentioned above.

SUMMARY OF THE INVENTION

The present invention relates to a table and comprises a table top, and at least one collapsible leg is connected to the underside of the table top. The at least one collapsible leg includes a top tube, a middle tube and a bottom tube. The top end of the top tube is connected to a connector which is connected to the underside of the table top. The middle tube is movably inserted in the top tube, and the bottom tube is movably inserted in the middle tube. A transverse bar is connected to the lower end of the bottom tube of the at least one collapsible leg. The connector has a motor received therein. An inner threaded rod has the top end thereof connected to the output portion of the motor. An outer threaded rod is movably mounted to outside of the inner threaded rod. Multiple guide grooves are defined axially in the inner periphery of the outer threaded rod. A slide is fixed to the inner threaded rod and includes multiple ridges extending therefrom. The ridges are slidably engaged with the guide grooves. A top nut is fixed to the middle tube and threadedly connected to the inner threaded rod. A bottom nut is connected to the bottom tube and threadedly connected to the outer threaded rod.

When the motor drives the inner threaded rod, the outer threaded rod is co-rotated by the slide. The outer threaded rod is moved relative to the inner threaded rod. The middle tube moves relative to the top tube. The bottom tube moves relative to the middle tube.

The primary object of the present invention is to provide a table with multiple collapsible legs wherein each collapsible leg is light in weight and extends a longer distance.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 5:
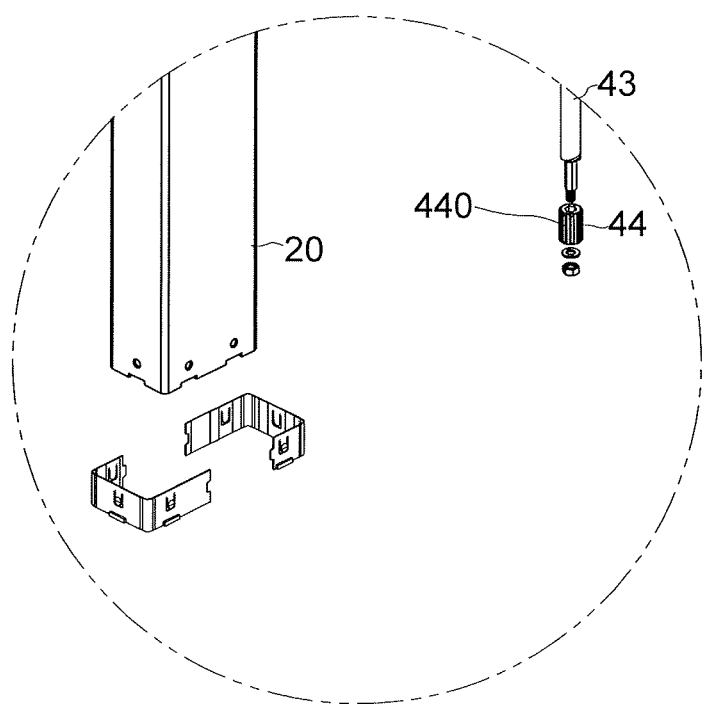
FIG. 5 is an enlarged view of the circled "D" of FIG. 1.
Figure 6:
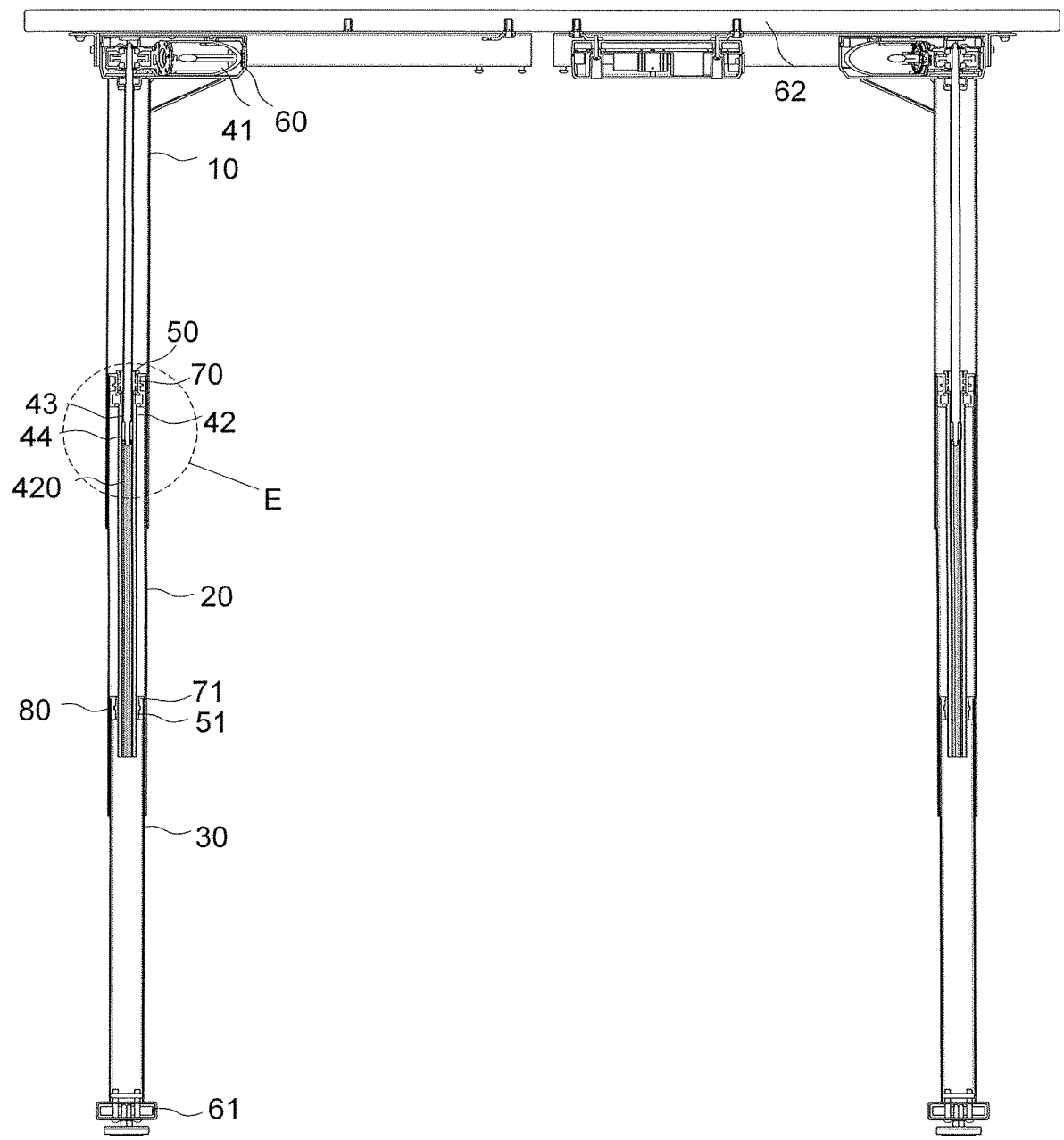
FIG. 6 shows that the collapsible legs extend to their full length.
Figure 7:
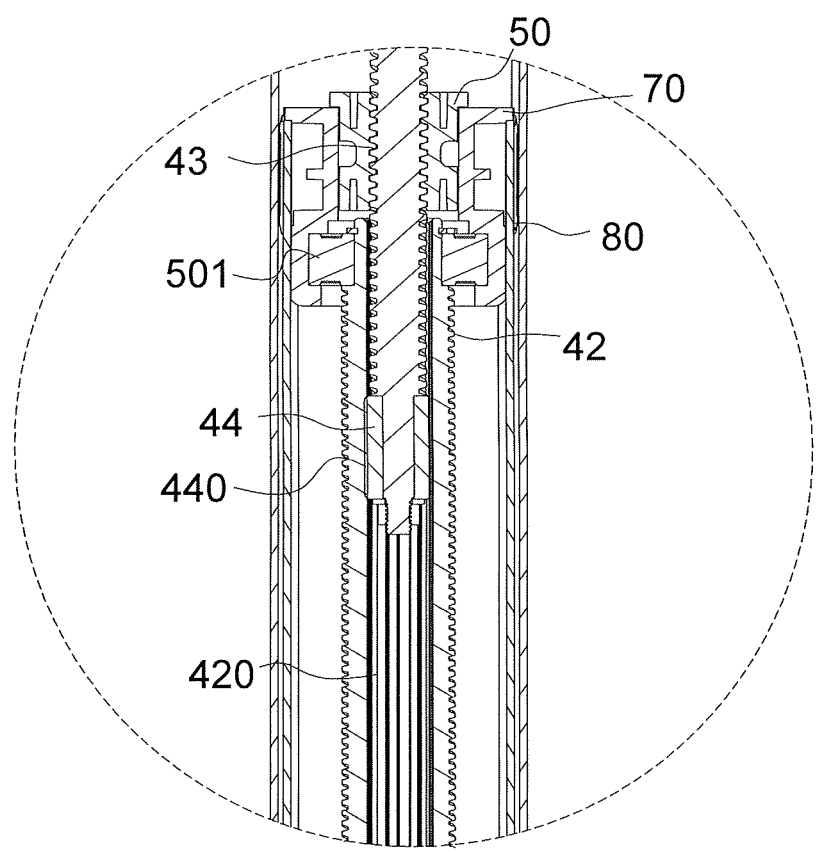
FIG. 7 is an enlarged view of the circled "E" of FIG. 6.

Referring to FIGS. 1 and 6-11, the table comprises a table top 62 and two collapsible legs 1 are connected to the underside of the table top 62. Each collapsible leg 1 includes a top tube 10, a middle tube 20 and a bottom tube 30. In this embodiment, the cross section of each of the top tube 10, the middle tube 20 and the bottom tube 30 is rectangular of shape. The inner diameter of the top tube 10 is larger than the outer diameter of the middle tube 20 so that the top tube 10 is mounted to outside of the middle tube 20, and the middle tube 20 is movably inserted in the top tube 10. The inner diameter of the middle tube 20 is larger than the outer diameter of the bottom tube 30 so that the middle tube 20 is mounted to outside of the bottom tube 30. The bottom tube 30 is movably inserted in the middle tube 20. Two connectors 60 are respectively connected to the underside of the table top 62, and the two respective top ends of the two top tubes 10 are respectively connected to two connectors 60. Each connector 60 has a motor 41 received therein. A transverse bar 61 is connected to the lower end of the bottom tube 30 of each collapsible leg 1. An inner threaded rod 43 has the top end thereof connected to the output portion of each of the motors 41. An outer threaded rod 42 is movably mounted to outside of the inner threaded rod 43 corresponding thereto. Multiple guide grooves 420 are defined axially in the inner periphery of each of the outer threaded rods 42. As shown in FIGS. 5 and 7, a slide 44 is fixed to each of the inner threaded rods 43 and includes multiple ridges 440 extending therefrom. The ridges 440 are slidably engaged with the guide grooves 420 corresponding thereto. A top nut 50 is fixed to each of the middle tubes 20 and threadedly connected to the inner threaded rod 43 corresponding thereto. A bottom nut 51 is connected to each of the bottom tubes 30 and threadedly connected to the outer threaded rod 42 corresponding thereto.

Figure 8:
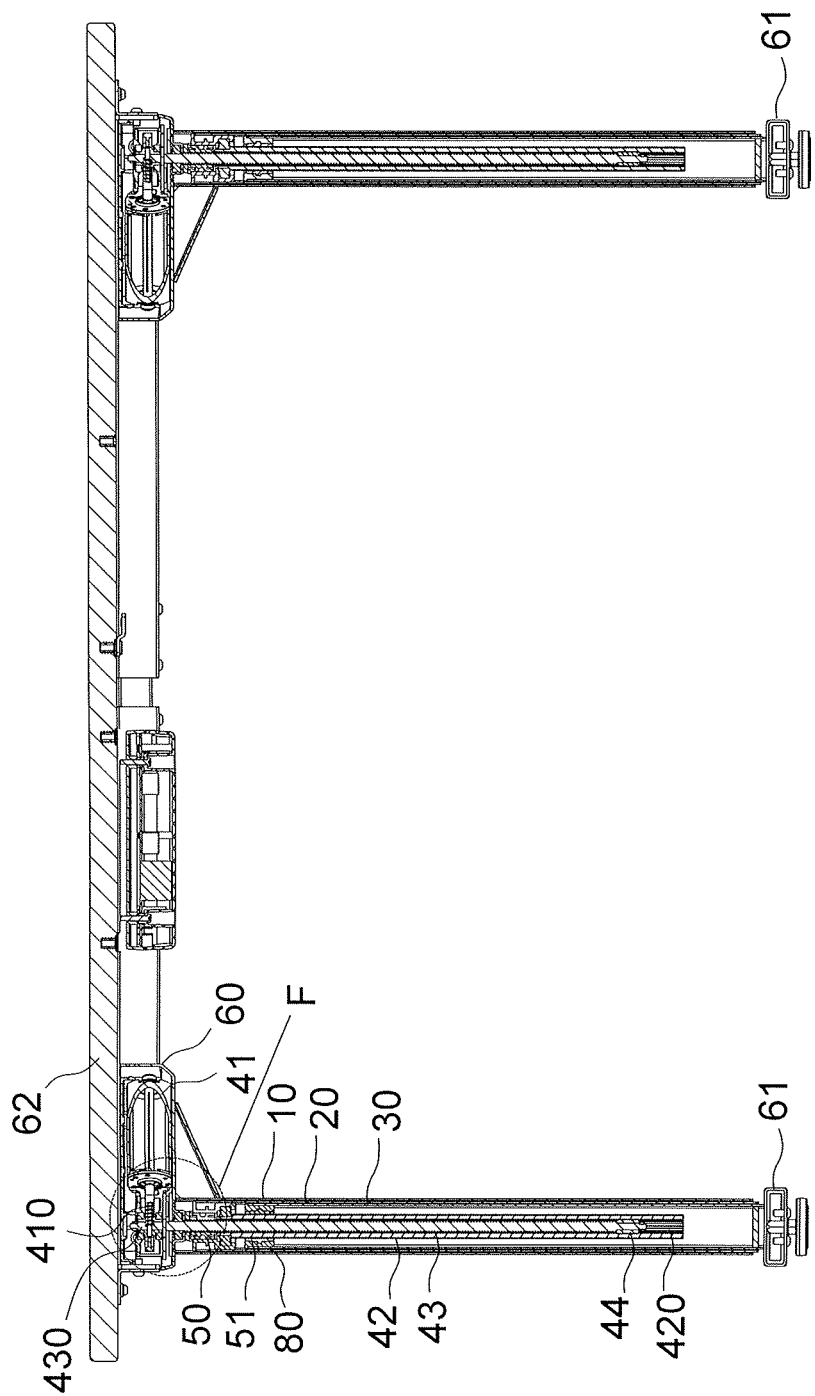
FIG. 8 shows that the collapsible legs are in retracted status.
Figure 9:
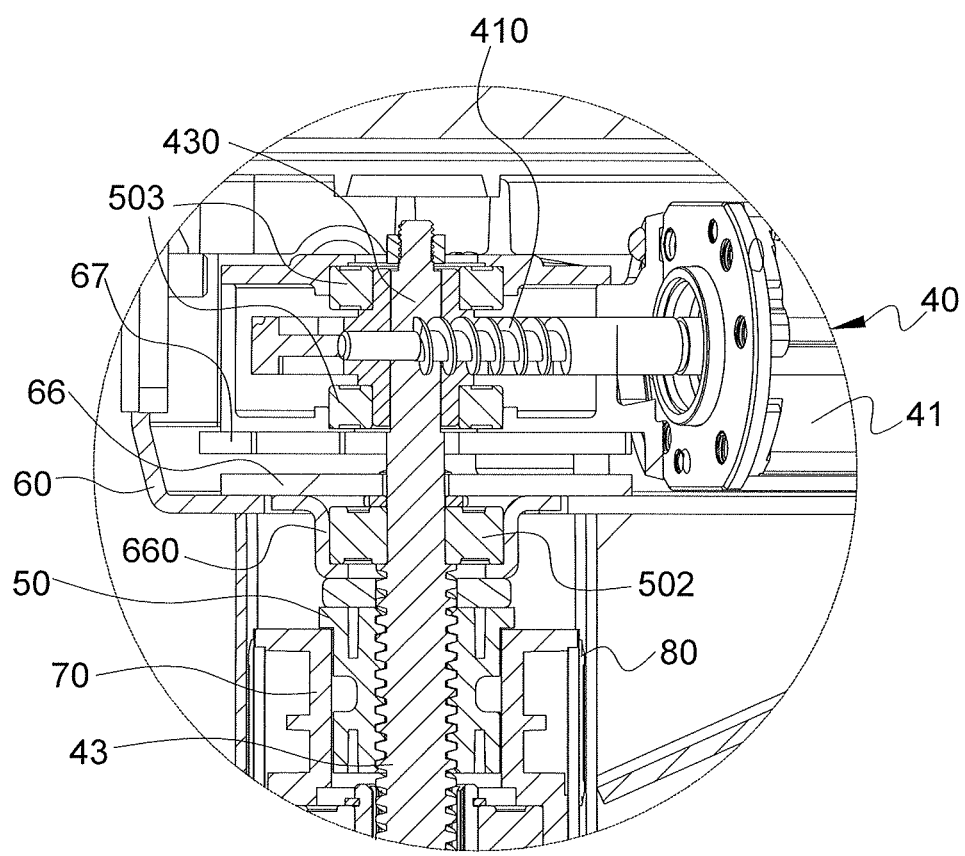
FIG. 9 is an enlarged view of the circled "F" of FIG. 8.

As shown in FIGS. 8 and 9, the output portion of the motor 41 includes a worm rod 410. A worm gear 430 is connected to the top end of the inner threaded rod 43 and is engaged with the worm rod 410. The angle between the axis of the worm rod 410 and the axis of each of the top tube 10, the middle tube 20, the bottom tube 30, the outer threaded rod 42 and the inner threaded rod 43 is substantially 90 degrees.

Figure 1:
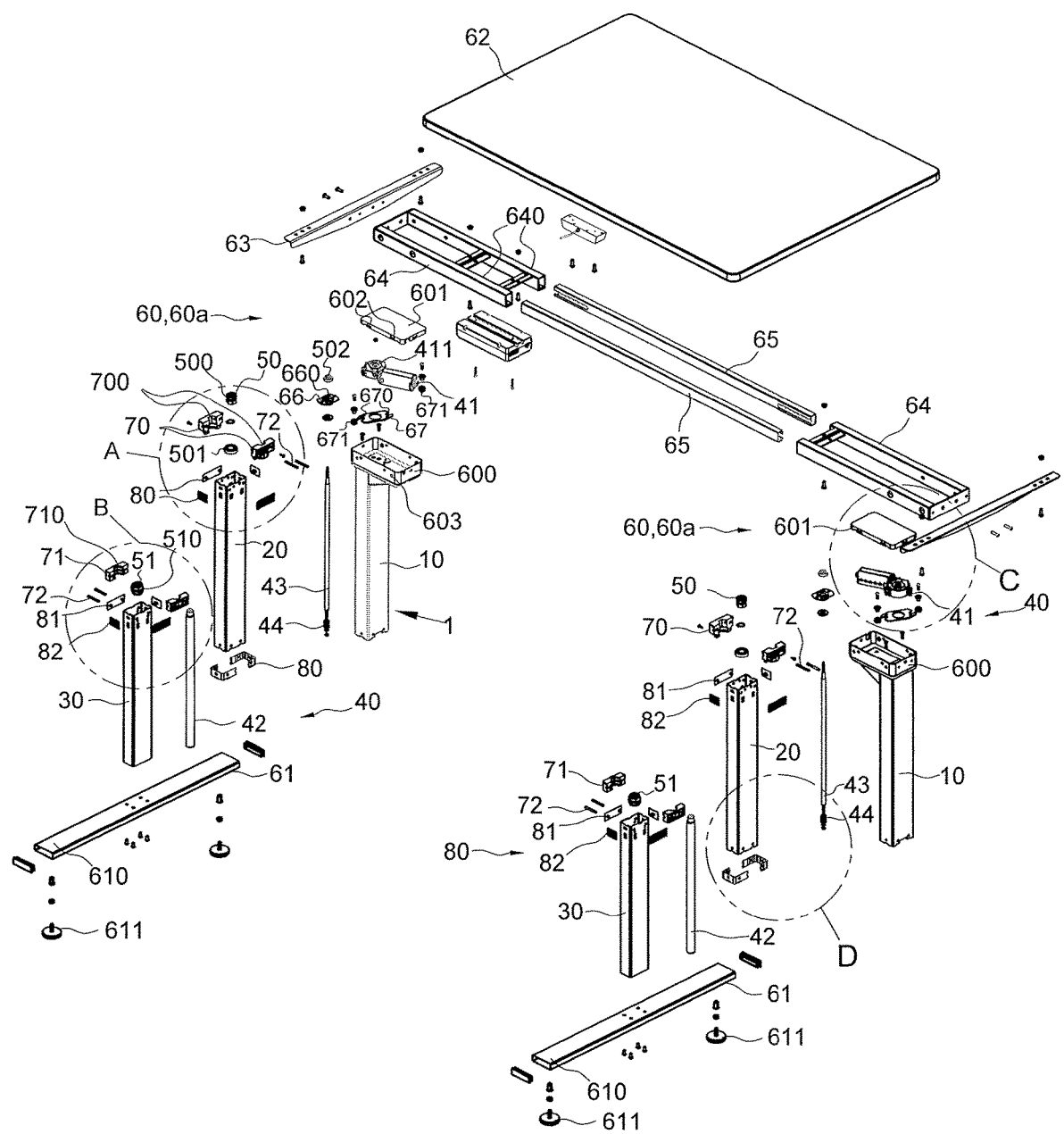
FIG. 1 is an exploded view to show the collapsible legs and the table top of the present invention.
Figure 2:
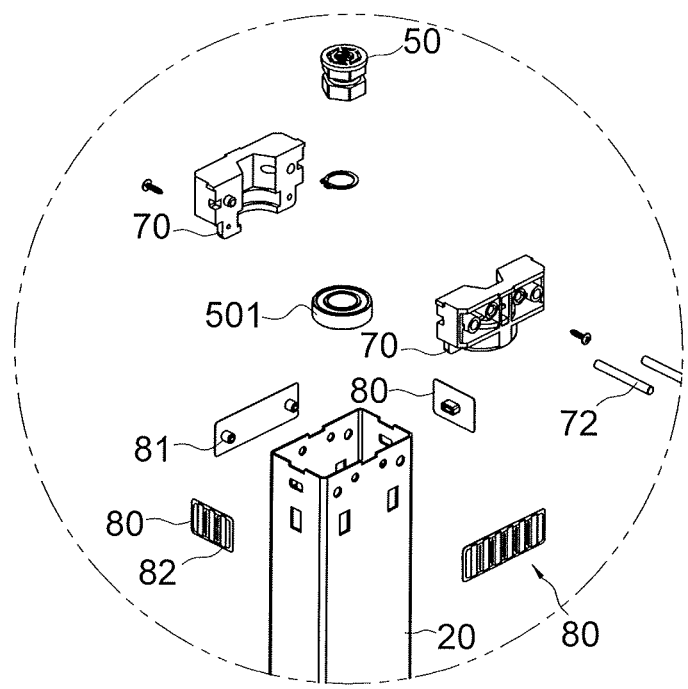
FIG. 2 is an enlarged view of the circled "A" of FIG. 1.
Figure 3:
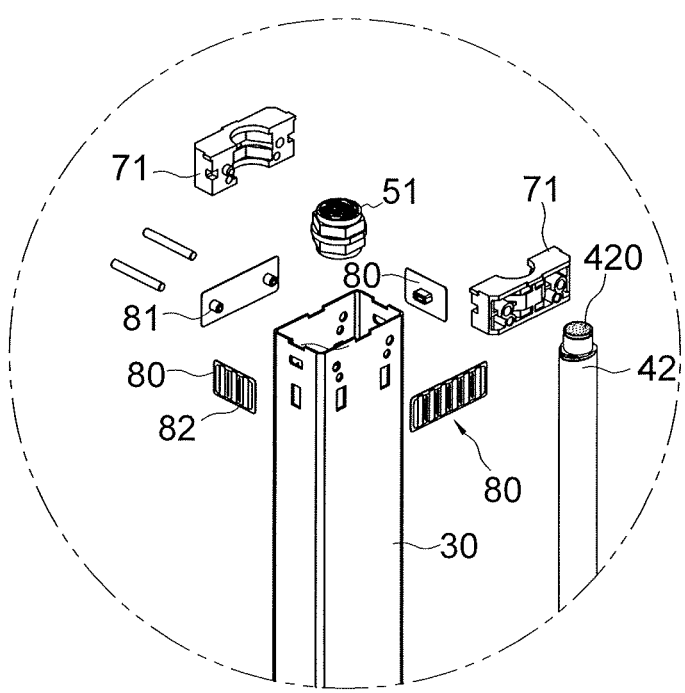
FIG. 3 is an enlarged view of the circled "B" of FIG. 1.

As shown in FIGS. 1 to 3, two top clamps 70 are secured to the inside of a top end of the middle tube 20, and the top nut 50 is clamped between the two top clamps 70. Two bottom clamps 71 are secured to the inside of the top end of the bottom tube 30, and the bottom nut 51 is clamped between the two bottom clamps 71. The two top clamps 70 are connected by multiple bolts 72, and the two bottom clamps 71 are connected by multiple bolts 72. Multiple protrusions 81 respectively extend through the wall of the middle tube 20 and the wall the bottom tube 30 for each collapsible leg 1. The protrusions 81 extend into the two top clamps 70 and the two bottom clamps 71 by respective front ends thereof so that the two top clamps 70 are connected to the middle tube 20 and the two bottom clamps 71 are connected to the bottom tube 30. Each of the top clamps 70 and the bottom clamps 71 includes a polygonal recess 700/701 in which a polygonal head 500/510 of the top nut 50 and the bottom nut 51 is received. A bearing 501 is located between the two top clamps 70 and the outer threaded rod 42.

As shown in FIGS. 1 to 3 and 5, multiple plates 80 are attached to outside of the middle tube 20 and outside of the bottom tube 30. Each of the plates 80 has the protrusions 81 extending from the inner face thereof Each of the plates 80 includes at least one recessed room 82 defined in the outer face thereof Lubricant is filled in the at least one recessed room 82 so as to lubricate the middle tube 20 and the bottom tube 30.

Figure 4:
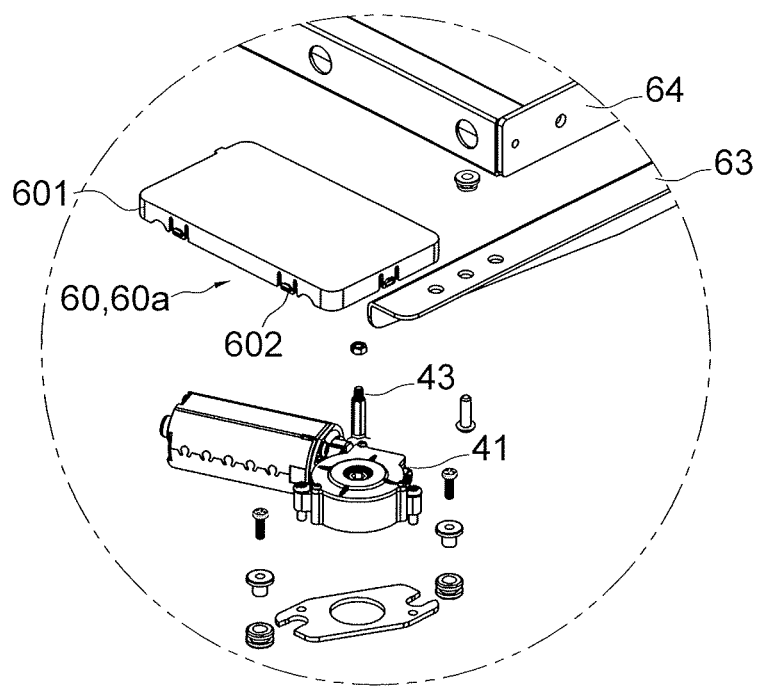
FIG. 4 is an enlarged view of the circled "C" of FIG. 1.

Each of the transverse bars 61 includes a straight section 610, and the lower end of the bottom tube 30 is fixed to the middle portion of the straight section 610. The length of the straight section 610 is longer than ½ length of the bottom tube 30. The axis of the straight section 610 is perpendicular to the axis of the bottom tube 30. Therefore, when the two straight sections 610 are put on the floor, the bottom tubes 30 are located upright. As shown in FIGS. 1 and 4, the table top 62 includes two short sides and two long sides. Two support bars 63 are respectively connected to the two short sides of the underside of the table top 62. Two rails 65 are connected to the two long sides of the underside of the table top 62. Two seats 64 are respectively connected to tow ends of the two rails 65 and each seat 64 has two slide grooves 640 in which the two ends of the two rails 65 corresponding thereto is movably engaged. Furthermore, the connector 60 includes a box 60a which is fixedly connected to the seat 64. The motor 41 is received in the box 60a which is positioned at the underside of the table top 62. The two support bars 63 are connected to the two seats 64 which is slidable along the two rails 65. As shown in FIGS. 1 and 4, each box 60a includes a body 600 and a cover 601 which is mounted to the body 600. The two panels of the cover 601 each have a resilient engaging member 602. The two panels of the body 600 each have at least one bore 603 with which the resilient engaging member 602 is resiliently positioned. The bearing 502 is located between an inner side of a bowl-shaped receiving portion 660 of a bottom plate 66 and the inner threaded rod 43. The bottom plate 66 is positioned on the inner bottom of the box 60a, and the bottom portion of the bowl-shaped receiving portion 660 protrudes through the outer bottom of the box 60a. The top end of the inner threaded rod 43 extends in the inner side of the box 60a and engages with the worm rod 410 of the motor 41. An end cover 411 is equipped on one end of the motor 41. The worm rod 410 and the top end of the inner threaded rod 43 are positioned in the inner side of the end cover 411 and engaged with each other. Two bearings 503 are located between the end cover 411 and the top end of the inner threaded rod 43. A support plate 67 is positioned at the bottom inner side of the box 60a, and between the end cover 411 and the bottom plate 66 to contact and support the end cover 411. Two recessed slots 670 are defined on two sides of the support plate 67. Two cushion seats 671 are mounted in the two recessed slots 670 respectively and positioned between the bottom plate 66 and the support plate 67.

Figure 10:
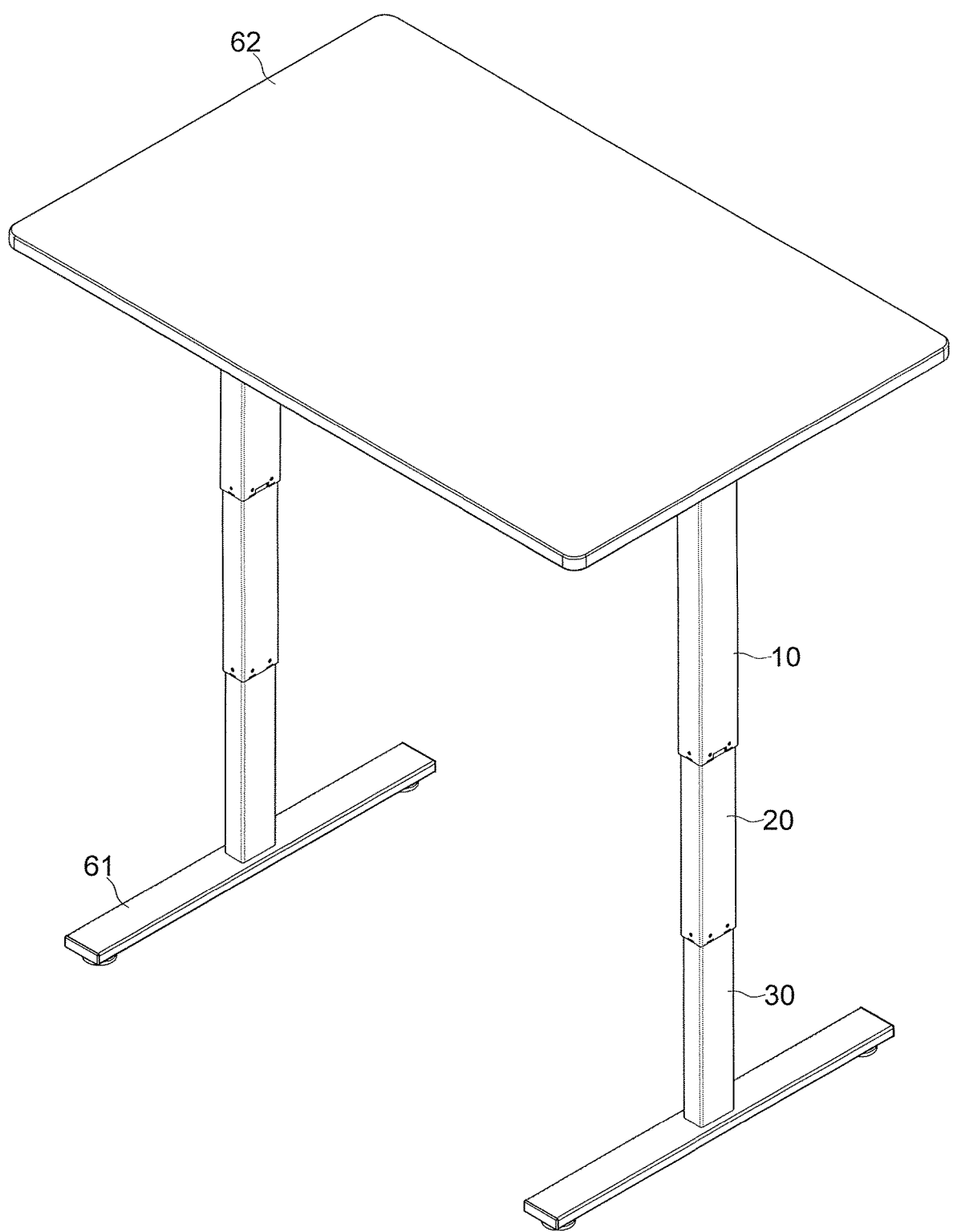
FIG. 10 is a perspective view to show that the collapsible legs extend to their full length.
Figure 11:
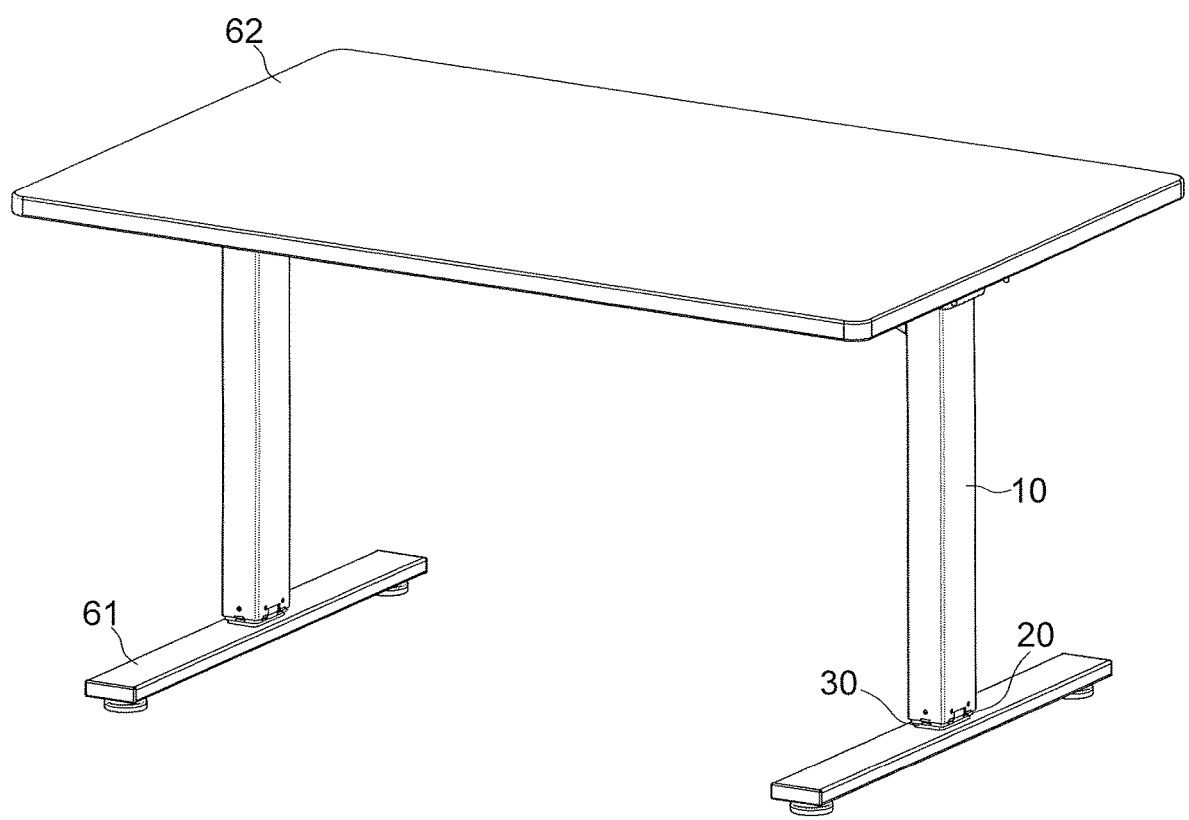
FIG. 11 is a perspective view to show that the collapsible legs are in their retractable status.

When the motors 41 drive the inner threaded rods 43 clockwise, the outer threaded rods 42 are co-rotated clockwise by the slides 44. Due to the connection between the top and bottom nuts 50, 51 and the inner and outer threaded rods 43, 42, the outer threaded rods 42 respectively extend relative to the inner threaded rods 43. The middle tubes 20 respectively extend relative to the top tubes 10, and the bottom tubes 30 move relative to the middle tubes 20. Therefore, the table top 62 is lifted as shown in FIGS. 6 and 10.

As shown in FIGS. 1, 6 and 8, when the motors 41 drive the inner threaded rods 43 counter clockwise, the outer threaded rods 42 are co-rotated counter clockwise by the slides 44. Due to the connection between the top and bottom nuts 50, 51 and the inner and outer threaded rods 43, 42, the outer threaded rods 42 respectively extend relative to the inner threaded rods 43. The middle tubes 20 respectively retract relative to the top tubes 10, and the bottom tubes 30 retract relative to the middle tubes 20. Therefore, the table top 62 is lowered.

While we have shown and described the embodiment in accordance with the present invention, it should be clear to those skilled in the art that further embodiments may be made without departing from the scope of the present invention.

What is claimed is:

1. A table with at least one collapsible leg, comprising:
   a table top;
   at least one collapsible leg connected to an underside of the table top, the at least one collapsible leg including a top tube, a middle tube and a bottom tube, a connector connected to the underside of the table top, a top end of the top tube connected to the connector, the middle tube movably inserted in the top tube, the bottom tube movably inserted in the middle tube, a transverse bar connected to a lower end of the bottom tube of the at least one collapsible leg, the connector having a motor;
   an inner threaded rod having a top end thereof connected to an output portion of the motor;
   an outer threaded rod movably mounted to the outside of the inner threaded rod, multiple guide grooves defined axially in an inner periphery of the outer threaded rod;
   a slide fixed to the inner threaded rod and including multiple ridges extending therefrom, the ridges slidably engaged with the guide grooves;
   a top nut fixed to the middle tube and threadedly connected to the inner threaded rod;
   a bottom nut connected to the bottom tube and threadedly connected to the outer threaded rod, and
   when the motor drives the inner threaded rod, the outer threaded rod is co-rotated by the slide, the outer threaded rod is moved relative to the inner threaded rod, the middle tube moves relative to the top tube, the bottom tube moves relative to the middle tube.

2. The table with at least one collapsible leg as claimed in claim 1, wherein two top clamps are secured to an inside of a top end of the middle tube and the top nut is clamped between the two top clamps, two bottom clamps are secured to an inside of a top end of the bottom tube and the bottom nut is clamped between the two bottom clamps.

3. The table with at least one collapsible leg as claimed in claim 2, wherein the two top clamps are connected by at least one bolt, the two bottom clamps are connected by at least one bolt, multiple protrusions respectively extend through a wall of the middle tube and a wall the bottom tube, the protrusions extend into the two top clamps and the two bottom clamps by respective front ends thereof so that the two top clamps are connected to the middle tube and the two bottom clamps are connected to the bottom tube.

4. The table with at least one collapsible leg as claimed in claim 3, wherein multiple plates are attached to outside of the middle tube and outside of the bottom tube, each of the plates has the protrusions extending from an inner face thereof.

5. The table with at least one collapsible leg as claimed in claim 4, wherein each of the plates includes at least one recessed room defined in an outer face thereof, lubricant is filled in the at least one recessed room so as to lubricate the top tube and the bottom tube.

6. The table with at least one collapsible leg as claimed in claim 2, wherein each of the top clamps and the bottom clamps includes a polygonal recess in which a polygonal head of the top nut and the bottom nut is received.

7. The table with at least one collapsible leg as claimed in claim 2, wherein a bearing is located between the two top clamps and the outer threaded rod, another bearing is located between the connector and the inner threaded rod.

8. The table with at least one collapsible leg as claimed in claim 1, wherein the table top includes two short sides and two long sides, two support bars are respectively connected to the two short sides of the underside of the table top, two rails are connected to the two long sides of the underside of the table top, two seats are respectively connected to the two rails and each seat has a slide groove in which the rail corresponding thereto is engaged, the connector includes a box which is connected to the seat, the two support bars are connected to the two seats which is slidable along the two rails.

9. The table with at least one collapsible leg as claimed in claim 1, wherein the transverse bar includes a straight section and a lower end of the bottom tube is fixed to a middle portion of the straight section, a length of the straight section is longer than ½ length of the bottom tube, an axis of the straight section is perpendicular to an axis of the bottom tube, the output portion of the motor includes a worm rod, a worm gear is connected to the top end of the inner threaded rod and is engaged with the worm rod, the connector includes a box in which the motor is received in the box, the box is positioned at the underside of the table top.

10. The table with at least one collapsible leg as claimed in claim 9, wherein an angle between an axis of the worm rod and an axis of each of the top tube, the middle tube, the bottom tube, the outer threaded rod and the inner threaded rod is substantially 90 degrees.

11. The table with at least one collapsible leg as claimed in claim 1, wherein a cross section of each of the top tube, the middle tube and the bottom tube is rectangular of shape, an inner diameter of the top tube is larger than an outer diameter of the middle tube so that the top tube is mounted to outside of the middle tube, an inner diameter of the middle tube is larger than an outer diameter of the bottom tube so that the middle tube is mounted to outside of the bottom tube.

12. The table with at least one collapsible leg as claimed in claim 1, wherein the connector includes a box which is connected to the underside of the table top; a bearing is located between an inner side of a bowl-shaped receiving portion of a bottom plate and the top end of the inner threaded rod; the bottom plate is positioned on an inner bottom of the box, and a bottom portion of the bowl-shaped receiving portion protrudes through an outer bottom of the box; the top end of the inner threaded rod extends in an inner side of the box and engages with the output portion of the motor; an end cover is equipped on one end of the motor; the output portion of the motor and the top end of the inner threaded rod are positioned in the inner side of the end cover and engaged with each other.

13. The table with at least one collapsible leg as claimed in claim 12, wherein two bearings are located between the end cover and the top end of the inner threaded rod; a support plate is positioned on a bottom inner side of the box, and between the end cover and the bottom plate to contact and support the end cover.

14. The table with at least one collapsible leg as claimed in claim 13, wherein two recessed slots are defined on two sides of the support plate; two cushion seats are mounted in the two recessed slots respectively and positioned between the bottom plate and the support plate.

\* \* \* \* \*